United States Patent
Awadallah et al.

(10) Patent No.: US 6,449,251 B1
(45) Date of Patent: Sep. 10, 2002

(54) PACKET MAPPER FOR DYNAMIC DATA PACKET PRIORITIZATION

(75) Inventors: Amr A. Awadallah, Stanford; Michael Chen, Cupertino; David Li, Stanford; Manu Thapar, Freemont, all of CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/285,127

(22) Filed: Apr. 2, 1999

(51) Int. Cl.[7] .............................. H04L 12/56; G06F 9/00; G06F 1/24; G06F 15/16
(52) U.S. Cl. ................... 370/229; 370/412; 370/465; 709/103; 709/235; 709/244; 713/100; 713/201
(58) Field of Search ................... 370/229–230, 370/352, 389, 386, 395, 398, 412, 465, 422, 254; 709/103, 220–221, 223–224, 230, 235, 238, 240, 244; 713/100, 200–201

(56) References Cited

U.S. PATENT DOCUMENTS

| | | | |
|---|---|---|---|
| 5,636,371 A | 6/1997 | Yu | 395/500 |
| 5,729,685 A | 3/1998 | Chatwani et al. | 395/200.11 |
| 5,802,286 A | 9/1998 | Dere et al. | 395/200.5 |
| 5,826,014 A | 10/1998 | Coley et al. | 395/187.01 |

OTHER PUBLICATIONS

Thom, Gary A., "The Multimedia Communications Standard for Local Area Networks", *IEEE Communications Magazine*, Dec. 1996, vol. 34, No. 12, pp. 52–56.

*Primary Examiner*—Wellington Chin
*Assistant Examiner*—Maikhanh Tran

(57) ABSTRACT

A packet mapper prioritizes streams of data packets in a computer network, each data packet having a packet header containing feature values descriptive of the data packet. The packet mapper includes a mapping table that associates application-related features with network-reserved feature values from a range of feature values reserved for use by selected network data packet streams, and a feature value mapper that performs at least one of (i) in each packet header having an application-related feature value associated with a network-reserved feature value, substituting the associated network-reserved feature value for the application-related feature value, and (ii) in each packet header having a network-reserved feature value associated with an application-related feature value, substituting the associated application-related feature value for the network-reserved feature value.

50 Claims, 3 Drawing Sheets

| Session ID 301 | Local IP Address 302 | Local Port 303 | Remote IP Address 304 | Remote Port 305 | High Priority Port 306 | Type 307 | Bandwidth 308 |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

FIG. 3

PACKET MAPPER FOR DYNAMIC DATA PACKET PRIORITIZATION

TECHNICAL FIELD

The present invention relates generally to digital data transmission, and more specifically to data prioritization in computer networks.

BACKGROUND ART

A computer network is a system of individual computers, computer peripheral devices—e.g.,printers, modems, scanners, etc., and associated interconnecting cables and equipment. Various recognized hardware and software protocols specify how to configure and operate such network devices in order to exchange data. Data transfer over a network can be described by various characteristics including accuracy, dependability, and speed.

As computer networks initially evolved, protocols such as TCP/IP (Transmission Control Protocol/Internet Protocol) and network services such as FTP (File Transfer Protocol) emerged in which error-free data transmission was the most important requirement. Considerations such as transmission delay and jitter received no special attention. Over time, however, new applications and services have emerged, such as real-time and multi-media applications, in which data transmission accuracy is less important, and considerations such as delay and jitter are more important.

For applications such as Internet telephony services, it is desirable that voice data packet traffic receive priority handling in preference to other network data services. If the voice packets use a known pre-assigned UDP (User Datagram Protocol) port (e.g., 7070) then a network administrator can manually set traffic filters in network devices, especially in legacy router and switches, to provide that voice packets be given high priority. However, some data transmission standards, e.g., H.323, utilize dynamically assigned UDP ports which cannot be predicted in advance.

In addition, malicious users might know that UDP port 7070 is prioritized, and hence would set their applications to use this port number, even though their applications might be very aggressive and bursty rather than the intended voice data. Similarly, some applications might unintentionally use one of the prioritized ports without proper authorization. Such use of priority data queues by unauthorized applications reduces the usefulness of data stream prioritization. Accordingly, unauthorized applications need to be prevented from using such prioritized port numbers.

SUMMARY OF THE INVENTION

A preferred embodiment of the present invention includes a packet mapper that maps streams of data packets in a computer network, each data packet having a packet header containing feature values descriptive of the data packet. The packet mapper includes a mapping table that associates application-related feature values with network-reserved feature values from a range of feature values reserved for use by selected network data packet streams, and a feature value mapper that performs at least one of: (i) in each packet header having an application-related feature value associated with a network-reserved feature value, substituting the associated network-reserved feature value for the application-related feature value, and (ii) in each packet header having a network-reserved feature value associated with an application-related feature value, substituting the associated application-related feature value number for the network-reserved feature value.

A preferred embodiment also includes a method of prioritizing streams of data packets in a computer network, each data packet having a packet header containing feature values descriptive of the data packet. The method includes associating application-related feature values with a network-reserved feature values from a range of feature values reserved for use by selected priority data streams; and performing at least one of: (i) in each packet header having an application-related feature value associated with a network-reserved feature value, substituting the associated network-reserved feature value for the application-related feature value; and (ii) in each packet header having a network-reserved feature value associated with an application-related feature value, substituting the associated application-related feature value number for the network-reserved feature value. Preferred embodiments also include a computer program product comprising a computer-usable medium having computer-readable program code thereon for performing the various steps of the above method.

Another preferred embodiment includes a router for prioritizing streams of data packets in a computer network, each data packet having a packet header containing feature values descriptive of the data. The router includes a plurality of data interfaces for streams of data packets to enter and exit the router, and a packet mapper that maps the data streams. The packet mapper includes a mapping table that associates application-related feature values with network-reserved feature values from a range of feature values reserved for use by selected network data packet streams, and a feature value mapper that performs at least one of: (i) in each packet header having an application-related feature value associated with a network-reserved feature value, substituting the associated network-reserved feature value for the application-related feature value, and (ii) in each packet header having a network-reserved feature value associated with an application-related feature value, substituting the associated application-related feature value number for the network-reserved feature value. A preferred embodiment also includes a computer network having a plurality of prioritized streams of data packets, each data packet having a packet header containing feature values descriptive of the data packet. The computer network includes a plurality of subnetworks, each subnetwork having at least one application that generates a stream of data packets for transmission over the computer network, a plurality of routers that prioritize streams of data packets, at least one router having a plurality of data interfaces for streams of data packets to enter and exit the router, and a packet mapper that maps the data streams. The packet mapper includes a mapping table that associates application-related feature values with network-reserved feature values from a range of feature values reserved for use by selected network data packet streams, and a feature value mapper that performs at least one of: (i) in each packet header having an application-related feature value associated with a network-reserved feature value, substituting the associated network-reserved feature value for the application-related feature value, and (ii) in each packet header having a network-reserved feature value associated with an application-related feature value, substituting the associated application-related feature value number for the network-reserved feature value.

In any of the above embodiments, the feature values may include packet source data port values and packet destination data port values. The selected network data packet streams may be selected to provide quality of service (QoS) routing of the network data packet streams. There may further be included a priority violation reporter that identifies unauthorized data packet streams which are not selected network data packet streams that have data packet headers using network-reserved feature values. The priority violation reporter may further communicate the identity of such unauthorized data packet streams to a network administrator. The application-related feature values may have dynamically assigned data ports. The selected network data packet streams may be at least one of H.323, H.225.0, H.245, RTP (Real Time Protocol), RTCP (Real Time Control Protocol), and MGCP (Media Gateway Control Protocol) data packets. Alternatively, or in addition, the selected network data packet streams may include at least one of audio data, voice data, and video data. The feature values may be Transmission Control Protocol (TCP) data port numbers, and/or User Datagram Protocol (UDP) data port numbers.

BRIEF DESCRIPTION OF THE DRAWINGS

The present invention will be more readily understood by reference to the following detailed description taken with the accompanying drawings, in which:

FIG. 3 illustrates a port mapping table within a packet mapper.

DETAILED DESCRIPTION OF SPECIFIC EMBODIMENTS

Figure 1:
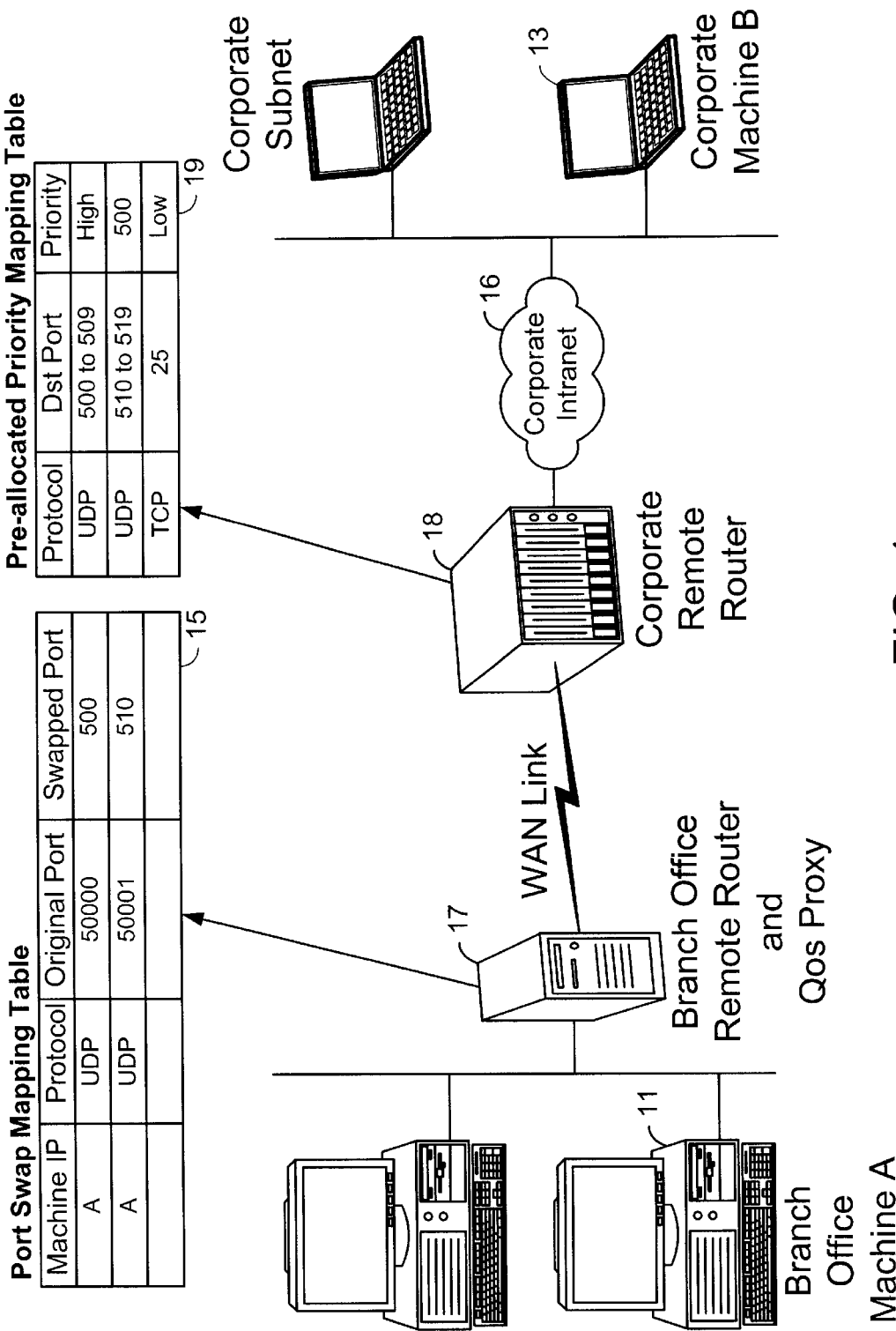
FIG. 1 illustrates a portion of a computer network and its associated port mapping scheme according to a preferred embodiment of the present invention.

In computer networks, many applications and communication protocols, such as FTP, H.323, MGCP, SGCP, or OGCP, use well-known data ports for control channels. After control channel setup, the port numbers for follow-on data channel are dynamically negotiated and selected by the two communication end-points. Existing network devices, such as routers and switches (including legacy devices), allow administrators to pre-allocate or reserve a range of ports for certain priority levels. However, for those applications and protocols that dynamically select port numbers for their data streams, network devices cannot predict these dynamic port numbers and therefore cannot serve these data streams with priorities.

A preferred embodiment of the present invention includes a packet mapper for network edge devices that connect directly to end-systems, e.g., PCS and servers. This packet mapper in network edge routers monitors the port number negotiation and selection for those applications and protocols that dynamically select data exchange port numbers, maintains a proxy table that maps dynamic port numbers to reserved port numbers for high priority traffics, and finally intercepts those data packets with dynamic port numbers and performs port swapping before routing these packets to the next hop router, and vice versa. In a preferred embodiment, the packet mapper is a QoS (quality of service) Proxy that provides network quality of service and improves network performance measures such as delay, delay jitter and packet loss.

One example of the above mentioned network edge devices is a router in a remote branch office that routes data packet traffic between the branch office router and a corporate remote router. The QoS Proxy in such an embodiment actively monitors all data packet traffic in the branch office router and performs two main tasks: (1) handling port number mapping and swapping for high priority data packet traffic between the branch office local area network (LAN) and the corporate wide area network (WAN) so as to use a range of reserved high priority ports for high priority traffic that employs dynamic port assignment, and (2) reporting to the network administrator any data packets that either maliciously or unintentionally use reserved high priority ports so as to allow either re-assignment of high priority port numbers or modification of the offending application.

A QoS Proxy thus provides a solution to supporting packet prioritization and QoS in existing legacy best-effort networks. It works especially well in controlling WAN links—typically the data flow bottlenecks—which connect remote branch offices to the central corporate office in an enterprise network. In such a system, once a network administrator reserves a range of high priority data ports, the QoS Proxy only needs to be added to the network edge device—the branch office router in this case—without requiring any further changes to pre-existing applications and corporate networks. By having a limited number of high priority ports, the QoS Proxy provides implicit admission control on high priority traffic across the WAN link. If the QoS Proxy runs out of high priority ports, then no more high priority connections can be accepted (but data can still be routed as best-effort traffic).

Packet traffic needs to be classified into different types or flows such that admission control rules can be applied. Packets are assigned to different priority queues with port mappings performed in the QoS Proxy for data protocols employing dynamic port assignment, such as for H.323 protocol traffic. Users can specify to use one or a combination of the following criteria to classify data packet traffic: source IP address and port number, destination IP address and port number, IP Type of Service (TOS) field. The classification criteria allow the QoS Proxy to focus on a particular field inside the packet header. Traffic types and flows that are admitted by the QoS Proxy to the priority queue have guaranteed shares of the bandwidth of the WAN link. Traffic not admitted to the priority queue may either be forwarded as best-effort traffic without guaranteed bandwidth, or dropped. Forwarded best-effort traffic may sometimes suffer from packet losses due to congestion in the best-effort queue.

For applications that adopt well-known or predefined port numbers, the classification can be done easily. But for applications or protocols that use dynamic port numbers, the classification is more difficult. For example, H.323 applications use well-known or predefined port numbers for a control channel, during which a dynamic port number is negotiated for a data channel. Thus, the classification for a H.323 packet flow can only be done by monitoring the port negotiation sessions during which the dynamic port numbers are determined. The port number information can be found in the H.225.0 and H.245 signaling messages. In fact for H.323 terminals without a Gatekeeper, H.225.0 starts the signaling using a well-known port number (1720) to select a port number for H.245. Then, H.245 will further select port numbers for audio and video streams. The dynamic port numbers are swapped with predefined port numbers or vice versa in the QoS Proxy for audio and video streaming traffic. In general, all H.323 audio packets will be in high priority class if they are admitted. In order to speed call setup, H.225.0 and H.245 signaling packets are also in high priority. H.323 video can be either high or best-effort priority.

For H.323 audio and video flows, in addition to capturing the dynamic port numbers, types of codecs (or maximum bit rate) must also be determined. The codec (coder/decoder) is used to predict how much bandwidth the flow will consume.

The bandwidth information is used to determine if the bandwidth criteria are met in admission control. The type of the codecs can be captured in the H.245 capability exchange message used during the call set up negotiation session for H.323. The transmitting terminal will specify which codec it is capable of. For example, G.723 audio and H.263 video would each be assigned separate numbers in the message.

Consider an example of an embodiment used for an H.323 NetMeeting voice and video session illustrated in FIG. 1. A NetMeeting session may be sought between Branch Office Machine A 11 and Corporate Office Machine B 13. When using NetMeeting to call other users over the Internet, several ports are required to establish the outbound connection as shown in the following:

| Port | Use |
|---|---|
| 389 | Internet Locator Server (TCP) |
| 522 | User Location Service (TCP) |
| 1503 | T.120 (TCP) |
| 1720 | H.323 call setup (TCP) |
| 1731 | Audio call control (TCP) |
| Dynamic | H.323 call control (TCP) |
| Dynamic | H.323 streaming (RTP over UDP) |

In such an embodiment, the QoS Proxy 15 in the Branch Office Remote Router 17 classifies message traffic from Machine A 11 to Machine B 13based on the source address/port. Message traffic from Machine B 13 to Machine A 11 is classified based on destination address/port. By monitoring port number 1720, the QoS Proxy 15 can capture the H.225.0 and H.245 negotiation packets to determine the codecs and dynamic port numbers used in the subsequent classification and prioritization of H.323 audio and video flows.

First Machine A 11 attempts H.323 call setup by opening a TCP connection to port 1720 on Machine B 13 (TCP port 1720 is the well-known default port for H.323 call setup). This call setup phase is used to negotiate which UDP ports the machines will use for the voice and video streams. For example, Machine A 11 may select to receive voice packets on port 50000 and to receive video packets on port 50001. The QoS Proxy 15 in the Branch Office Remote Router 17 intercepts the call setup data packet from Machine A to Machine B and replaces port 50000 with port 500, and port 50001 with port 510 (assuming the network administrator has reserved UDP port numbers 500–509 as high priority and 510–519 as medium priority in the Corporate Remote Router 18 and other routers in the Corporate Intranet). Thus, Machine B 13 is isolated from the details of ports 50000 and 50001 in Machine A 11; it only knows that it should send data packets to ports 500 and 510.

The data streaming session now starts, and Machine B 13 sends data packets to UDP ports 500 and 510, which are pre-allocated as high and medium priority in the Corporate Remote Router 18. These data packets are accordingly delivered at high and medium priority respectively to the Branch Office 17. It is the responsibility of the QoS Proxy 15 to maintain a port mapping table to swap the incoming high and medium priority ports back to the values expected by Machine A11, and to perform the reverse operations for data packets sent from Machine A 11 to the Corporate Intranet 16. It is also the responsibility of the Branch Office Remote Router 17 to deliver voice and video packets with high priority to the Corporate Remote Router 18 on the appropriate port from the reserved range of high priority ports.

Significantly, no changes need to be made to the structure of the Corporate Remote Router 18. The existing router prioritization features are used to achieve dynamic prioritization. In addition, no changes to the application and no special signaling or protocol are required. In fact a preferred embodiment can also be used to provide high priority for existing data applications, for example, for flight reservation transaction packets from the Branch Office 17 to the Corporate Intranet 16. For example, the QoS Proxy 15 may provide the network manager with a scripting language to define the behavior of new applications to be recognized by the QoS Proxy 15.

Figure 2:
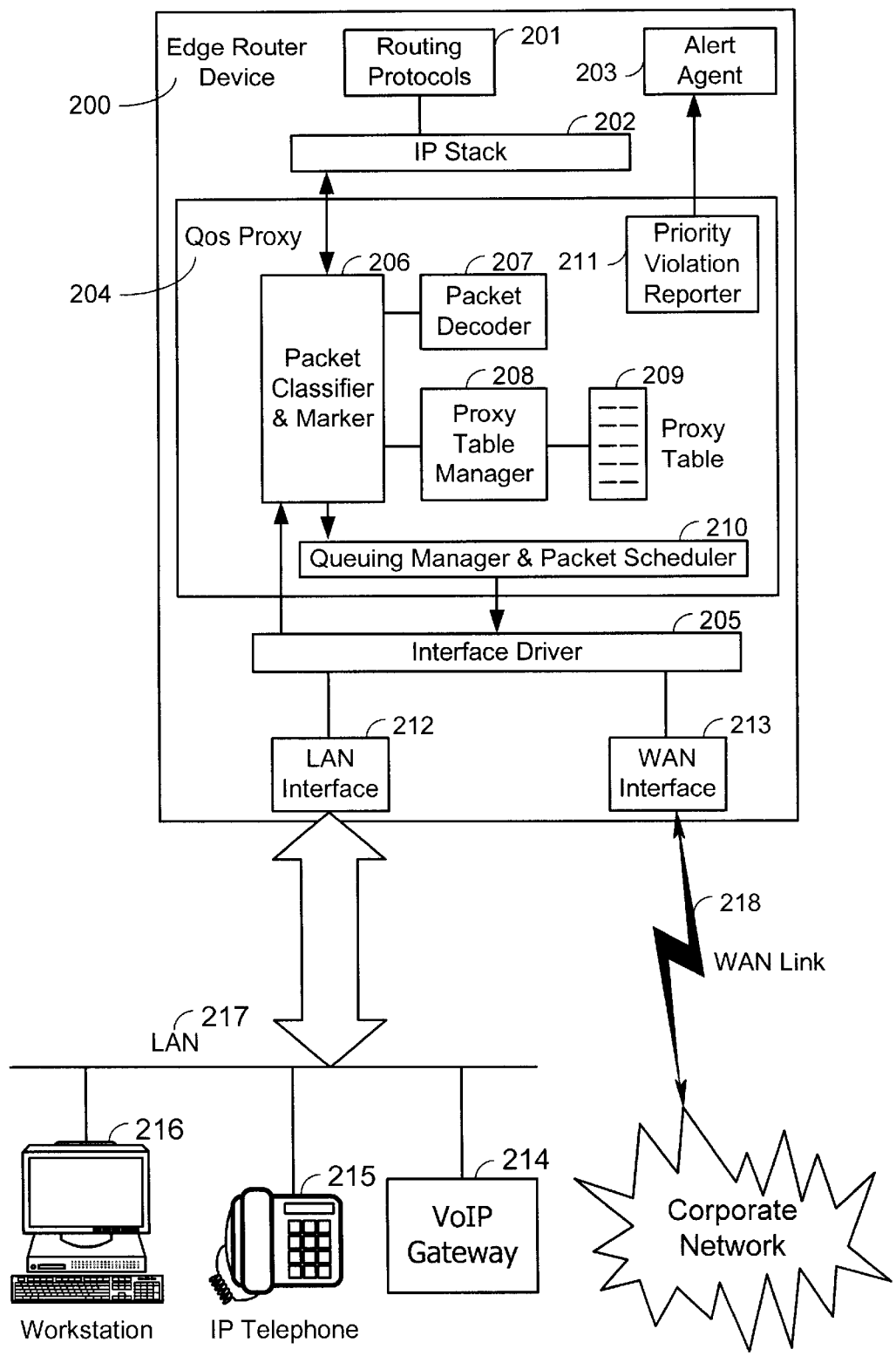
FIG. 2 illustrates a packet mapper according to a preferred embodiment.

FIG. 2 shows in greater detail the architecture of one representative embodiment. The edge router device 200 (corresponding to the Branch Office Router 17 in the above example) includes Routing Protocols 201, IP Stack 202, Alert a Agent 203, QoS Proxy 204, and Interface Driver 205. The QoS Proxy 204 further includes Packet Classifier and Marker 206, Packet Decoder 207, Proxy Table Manager 208, Proxy Table 209, Queuing Manager and Packet Scheduler 210, and Priority Violation Reporter 211.

The Packet Classifier 206 intercepts all packets flowing between the IP stack 202 and either of the network interfaces, LAN Interface 212 or WAN Interface 213 . If a packet belongs to a protocol of interest, then it is processed further by Packet Decoder 207 or by the Proxy Table Manager 208 for appropriate port swap. Otherwise, it is forwarded immediately. For packets to be transmitted out on an interface, their Type of Service (TOS) field in the packet IP header is marked appropriately in accordance with the DiffServ model [RFC 2474 and RFC 24751], and then they are placed in an appropriate queue for transmission. For packets received from one of the interfaces, they are delivered to the upper IP layer for further processing. Any priority violation detected by the QoS Proxy 204 is communicated with the Alert Agent 203 which in turn will generate an alert to the network administrator.

In a preferred embodiment, the QoS Proxy 204 supports audio, video, and data in the form of IP packets that use dynamic port numbers, e.g.,H.323 protocols or that use well-known port numbers. The QoS Proxy 204 supports audio packets generated by various application on a LAN 217 including Voice over IP (VoIP) gateways (GW Voice) 214, Ethernet IP phones 215, and PC applications (PC Audio/Video), 216 erg., Microsoft NetMeeting.

FIG. 3 depicts the structure of the port mapping Proxy Table 209 within the QoS Proxy 204. The first column represents the Session ID 301 which is unique for each data flow session. The second column contains the local IP addresses 302 of the machine that is directly connected to the network edge router device 200 in which an H.323 or MGCP application is running. The third column contains the corresponding local port number 303 used by these machines on the current H.323 session 32. The fourth column holds the remote IP address 304 of the remote end-system that is participating the current session. The fifth column contains the remote port number 305 used by the remote end-system. The sixth column holds the predefined and reserved high priority port number 306 on the WAN and other routers in the Intranet high priority packets, which will be swapped with the local port number 303 on-the-fly when the session's packets pass through the QoS Proxy 204. Other columns in the Proxy Table 209 include information on the session's type 307, such as voice, video, or data, and the session's bandwidth requirement 308, etc. An embodiment also may have a timer associated with each entry in the QoS Proxy Table 209. The timer is reset each time a port swap happens, and it times out the mapping if enough time has passed and no packet belonging to this session has arrived. This case occurs when the link has broken down or the H.323 application has closed.

The QoS Proxy 204 monitors the negotiation session between two H.323 protocol terminals (the H.225.0 and H.245 packets). If the codecs will be used for audio (and possibly video) communications with a remote H.323 application, an admission control decision will have to be made based on the bandwidth criterion. Upon admission, a unique mapping is established between the dynamic port number and reserved port number in the QoS Proxy 204. If there are no unused reserved port numbers in the QoS Proxy 204, however, the mapping fails. In such a case, unmapped outbound packets can still be assigned to their corresponding priority queues (since there is still bandwidth left for priority traffic) but packets of this session will not be treated with high priority in other routers since their port number is out of the reserved high priority port range. After the H.323 call setup, the QoS Proxy 204 continues to monitor the port number used by the H.245 for any teardown messages, i.e., End Session Command (to and from the initiator). After that, the corresponding QoS Proxy 204 table mapping entry will be deleted.

The QoS Proxy 208 further includes a Priority Violation Reporter 211 that identifies unauthorized data packet streams which are using reserved data ports. In such circumstances, the Priority Violation Reporter 211 communicates the identity of such unauthorized data packet streams to a network administrator with an alert message via the Alert Agent 203.

An admission control procedure also is needed for audio and video traffic flows to insure that the bandwidth on the outgoing WAN link is not oversubscribed and that the bandwidth is properly provisioned so that best effort traffic is not starved. Packets meeting admission control standards are treated as high priority traffic. Packets that do not meet admission control standards will either be forwarded, but treated as best-effort priority traffic without QoS guarantees, or dropped. Aggregated priority queueing is used with two priority classes: High Priority and Best-Effort Priority. H.323 signaling and voice traffic are in the High Priority class. PC Video can either be configured as High Priority or Best-Effort Priority class depending on the WAN link speed. Strict High Priority First (SHPF) queueing is used to serve the two priority classes.

However, the QoS Proxy 204 in the Branch Office Router 200, by itself is not enough to fulfill the QoS requirements. Other non-edge routers or network core devices need to be configured to support the required QoS. In the branch office/corporate headquarter scenario, the Corporate remote router controls the traffic from corporate LAN to branch office across a WAN link, which is typically the bottleneck in the corporate Intranet.

Almost all existing deployed routers have the capability of prioritizing network traffic based on pre-defined IP header information such as port numbers and IP addresses. Thus, a network administrator can configure all of the routers in the Intranet or in his domain (including those edge devices in branch offices) to pre-reserve a range of port numbers for high priority traffics. Since the QoS Proxy in edge device automatically swaps application's dynamic port number into the pre-reserved port range, the other routers only see packets of these applications carrying port numbers that are in the high priority port range, and therefore can handle them properly with high priority.

The admission control rules of the QoS Proxy 204 may be described in greater detail. As already mentioned, the purpose of admission control is to avoid the oversubscription of a bottleneck link of the network, such as the WAN link 218. This need is readily apparent for traffic flowing from branch office to corporate remote router. For traffic flowing in the reverse direction from the corporate remote router to the branch office, admission control on the side of the Branch Office Router 200 is in fact on behalf of the Corporate Remote Router when the traffic travels from the Corporate Remote Router over the WAN link 218 to the Edge Router Device 200. This is because most of the existing deployed routers and legacy devices are not expected to have a similar admission control capability.

The WAN link 218 is relatively slow and it is shared by all traffic types and flows in and out of the Branch Office Router 200. Most existing branch office configurations use one of the followings as the WAN link 218: 56k, ISDN, ADSL and T1. Hence priority queueing is needed on both ends of the WAN link 218 to insure high priority to the traffic that is sensitive to delay and packet loss. However there are installations where ATM or higher speed WAN links might be existing. In any case, the underlying WAN link 218 is treated as if it simply were a transport media or pipe that is transparent to the QoS modules on both ends.

What is claimed is:

1. A packet mapper that maps streams of data packets in a computer network to provide quality of service (QoS) routing, each data packet having a packet header containing data port numbers associated with the data packet, the packet mapper comprising:
   a router that includes a plurality of data interfaces for streams of data packets to enter and exit the router, wherein the router is for monitoring the port number negotiation and selection for applications and protocols within end-point devices that dynamically select data exchange port numbers, the router further including a mapping table that associates dynamically assigned data port numbers with network-reserved data port numbers from a range of data port numbers reserved for use by selected network data packet streams; and
   a data port number mapper that performs at least one of:
      (i) in each packet header having a dynamically assigned data port number associated with a network-reserved data port number, substituting the associated network-reserved data port number for the dynamically assigned data port number, and
      (ii) in each packet header having a network-reserved data port number associated with a dynamically assigned data port number, substituting the associated dynamically assigned data port number for the network-reserved data port number.

2. A packet mapper according to claim 1, wherein the data port numbers include a packet source data port value and a packet destination data port value.

3. A packet mapper according to claim 1, further including:
   a priority violation reporter that identifies unauthorized data packet streams that are not selected network data packet streams and that have data packet headers using network-reserved data port numbers.

4. A packet mapper according to claim 3, wherein the priority violation reporter further communicates the identity of such unauthorized data packet streams to a network administrator.

5. A packet mapper according to claim 1, wherein the application-related feature values are dynamically assigned data port numbers.

6. A packet mapper according to claim 1, wherein the selected network data packet streams include at least one of H.323, H.225.0, H.245, RTP (Real Time Protocol), RTCP (Real Time Control Protocol), and MGCP (Media Gateway Control Protocol) data packets.

7. A packet mapper according to claim 1, wherein the selected network data packet streams include at least one of audio data, voice data, and video data.

8. A packet mapper according to claim 1, wherein the data port numbers are Transmission Control Protocol (TCP) data port numbers.

9. A packet mapper according to claim 1, wherein the data port numbers are User Datagram Protocol (UDP) data port numbers.

10. A packet mapper according to claim 1, wherein the packet mapper performs both (i) and (ii).

11. A method of prioritizing streams of data packets in a computer network to provide quality of service (QoS) routing, each data packet having a packet header containing data port numbers descriptive of the data packet, the method comprising;
    monitoring the port number negotiation and selection for applications and protocols within end-point devices that dynamically select data exchange port numbers;
    associating dynamically assigned data port numbers with network-reserved data port numbers from a range of data port numbers reserved for use by selected priority data streams; and
    performing at least one of:
        (i) in each packet header having a dynamically assigned data port number associated with a network-reserved data port number, substituting the associated network-reserved data port number for the dynamically assigned data port number; and
        (ii) in each packet header having a network-reserved data port number associated with a dynamically assigned data port number, substituting the associated dynamically assigned data port number for the network-reserved data port number.

12. A method according to claim 11, wherein the data port numbers include a packet source data port value and a packet destination data port value.

13. A method according to claim 11, further including:
    identifying unauthorized data packet streams that are not selected network data packet streams and that have data packet headers using network-reserved data port numbers.

14. A method according to claim 13, further including: communicating the identity of such unauthorized data packet streams to a network administrator.

15. A method according to claim 11, wherein the application-related feature values are dynamically assigned data port numbers.

16. A method according to claim 11, wherein the selected network data packet streams include at least one of H.323, H.225.0, H.245, RTP (Real Time Protocol), RTCP (Real Time Control Protocol), and MGCP (Media Gateway Control Protocol) data packets.

17. A method according to claim 11, wherein the selected network data packet streams include at least one of audio data, voice data, and video data.

18. A method according to claim 11, wherein the data port numbers are Transmission Control Protocol (TCP) data port numbers.

19. A method according to claim 11, wherein the data port numbers use are User Datagram Protocol (UDP) data port numbers.

20. A method according to claim 11, wherein the are Transmission-Control Protocol (TCP) data port numbers.

21. A router for prioritizing streams of data packets in a computer network to provide quality of service (QoS) routing, each data packet having a packet header containing data port numbers descriptive of the data packet, the router comprising.
    a plurality of data interfaces for streams of data packets to enter and exit the router;
    circuitry for monitoring the streams of data packets that enter and exit the router; and
    a packet mapper that maps the streams of data packets, wherein the packet mapper includes:
    a mapping table that associates dynamically assigned data port numbers with network-reserved data port numbers from a range of data port numbers reserved for use by selected network data packet streams; and
    a data port number mapper that performs at least one of:
        (i) in each packet header having a dynamically assigned data port number associated with a network-reserved data port number, substituting the associated network-reserved data port number for the dynamically assigned data port number, and
        (ii) in each packet header having a network-reserved data port number associated with a dynamically assigned data port number, substituting the associated dynamically assigned data port number for the network-reserved data port number.

22. A router according to claim 21, wherein the data port numbers include a packet source data port value and a packer destination data port value.

23. A router according to claim 21, further including:
    a priority violation reporter that identifies unauthorized data packer streams that are not selected network data packet steams and that have data packet headers using network-reserved data numbers.

24. A router according to claim 23, wherein the priority violation reporter further communicates the identity of such unauthorized data packet streams to a network administrator.

25. A router according to claim 21, wherein the application-related feature values are dynamically assigned data port numbers.

26. A router according to claim 21, wherein the selected network data packet streams include at least one of H.323, H.225.0, H.245, RTP (Real Time Protocol), RTCP (Real Time Control Protocol), and MGCP (Media Gateway Control Protocol) data packets.

27. A router according to claim 21, wherein the selected network data packet streams include at least one of audio data, voice data, and video data.

28. A routher according to claim 21, wherein the data port numbers are Transmission Control Protocol (TCP) data port numbers.

29. A router according to claim 21, wherein the data port number are User Datagram Protocol (UDP) data port numbers.

30. A router according to claim 21, wherein the packet mapper performs both (i) and (ii).

31. A computer network having a plurality of prioritized streams of data packets providing quality of service (QoS) routing, each data packet having a packet header containing data port numbers descriptive of the data packet, the computer network comprising:
    a plurality of subnetworks, each subnetwork having at least one application that generates a stream of data packets for transmission over the computer network;

a plurality of routers that prioritize streams of data packets, at least one router having a plurality of data interfaces for streams of data packets to enter and exit the router, and a packet mapper that maps the streams of data packets, wherein the packet mapper includes:

a mapping table that associates dynamically assigned data port numbers with network-reserved data port numbers from a range of data port numbers reserved for use by selected network data packet streams; and a data port number mapper that performs at least one of:
(i) in each packet header having a dynamically assigned data port number associated with a network-reserved data port number, substituting the associated network-reserved data port number for the dynamically assigned data port number, and
(ii) in each packet header having a network-reserved data port number associated with a dynamically assigned data port number, substituting the associated dynamically assigned data port number for the network-reserved data port number.

32. A computer network according to claim 31, wherein the data port numbers include a packet source data port value and a packet destination data port value.

33. A computer network according to claim 31, further including:

a priority violation reporter that identifies unauthorized data packet streams that are not selected network data packet streams and that have data packet headers using network-reserved data port numbers.

34. A computer network according to claim 33, wherein the priority violation reporter further communicates the identity of such unauthorized data packet streams to a network administrator.

35. A computer network according to claim 31, wherein the application-related are dynamically assigned data port numbers.

36. A computer network according to claim 31, wherein the selected network data packet streams include at least one of H.323, H.225.0, H.245, RTP (Real Time Protocol), RTCP (Real Time Control Protocol), and MGCP (Media Gateway Control Protocol) data packets.

37. A computer network according to claim 31, wherein the selected network data packet streams include at least one of audio data, voice data, and video data.

38. A computer network according to claim 31, wherein the data port numbers are Transmission Control Protocol (TCP) data port numbers.

39. A computer network according to claim 31, wherein the data port numbers are User Datagran Protocol (UDP) data port numbers.

40. A computer network according to claim 31, wherein the packet mapper performs both (i) and (ii).

41. A computer program product for use on a computer system for monitoring and prioritizing streams of data packets in a computer network between end-point devices to provide quality of service (QoS) routing, each data packet having a packet header containing data port numbers descriptive of the data packet, the computer program product comprising a computer-usable medium having computer-readable program code thereon, the computer readable program code including:

program code for associating dynamically assigned data port numbers with network-reserved data port numbers from a range of data port numbers reserved for use by selected network data streams; and program code for performing at least one of:
(i) in each packet header having a dynamically assigned data port number associated with a network-reserved data port number, substituting the associated network-reserved data port number for the dynamically assigned data port number; and
(ii) in each packet header having a network-reserved data port number associated with a dynamically assigned data port number, substituting the associated dynamically assigned data port number for the network-reserved data port number.

42. A computer program product according to claim 41, wherein the data port numbers include a packet source data port value and a packet destination data port value.

43. A computer program product according to claim 41, further including:

program code for identifying unauthorized data packet streams that are not selected network data packet streams and that have data packet headers using network-reserved data port numbers.

44. A computer program product according to claim 43, further including:

program code for communicating the identity of such unauthorized data packet streams to a network administrator.

45. A computer program product according to claim 41, wherein the application-related are dynamically assigned data port numbers.

46. A computer program product according to claim 41, wherein the selected network data packet streams include at least one of H.323, H.225.0, H.245, RTP (Real Time Protocol), RTCP (Real Time Control Protocol), and MGCP (Media Gateway Control Protocol) data packets.

47. A computer program product according to claim 41, wherein the selected network data packet streams include at least one of audio data, voice data, and video data.

48. A computer program product according to claim 41, wherein the data port numbers are Transmission Control Protocol (TCP) data port numbers.

49. (amended) A computer program product according to claim 41, wherein the data port numbers are User Datagram Protocol (UDP) data port numbers.

50. A computer program product according to claim 41, wherein in the program code for performing, both (i) and (ii) are performed.

* * * * *